United States Patent
Schroeder (10) Patent No.: US 9,836,107 B2
(45) Date of Patent: Dec. 5, 2017

(54) FLEXIBLE POWER SUPPLIES FOR COMPUTING SYSTEMS

(71) Applicant: Microsoft Corporation, Redmond, WA (US)

(72) Inventor: James Darrin Schroeder, San Antonio, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 172 days.

(21) Appl. No.: 14/486,501

(22) Filed: Sep. 15, 2014

(65) Prior Publication Data

US 2016/0077559 A1    Mar. 17, 2016

(51) Int. Cl.
| | |
|---|---|
| *H02J 1/10* | (2006.01) |
| *G06F 1/26* | (2006.01) |
| *H01R 25/00* | (2006.01) |
| *H02B 1/26* | (2006.01) |
| *G06F 1/18* | (2006.01) |

(52) U.S. Cl.
CPC ............. *G06F 1/263* (2013.01); *G06F 1/189* (2013.01); *G06F 1/26* (2013.01); *H01R 25/00* (2013.01); *H02B 1/26* (2013.01)

(58) Field of Classification Search
CPC ...................................................... G06F 1/263
USPC ......................................................... 307/43
See application file for complete search history.

(56) References Cited

U.S. PATENT DOCUMENTS

| | | | |
|---|---|---|---|
| 6,608,406 B2 | 8/2003 | Bersiek | |
| 7,365,964 B2 * | 4/2008 | Donahue, IV | ....... H01R 13/514 |
| | | | 174/50 |
| 7,457,106 B2 | 11/2008 | Ewing et al. | |
| 8,384,244 B2 | 2/2013 | Peterson et al. | |
| 2003/0058613 A1 | 3/2003 | Varghese et al. | |
| 2004/0000815 A1 | 1/2004 | Pereira | |
| 2007/0046103 A1 | 3/2007 | Belady et al. | |
| 2009/0167086 A1 | 7/2009 | Seymour | |
| 2010/0254162 A1 | 10/2010 | Lanni | |
| 2013/0257160 A1 | 10/2013 | Harris et al. | |
| 2014/0078663 A1 | 3/2014 | Xu et al. | |
| 2014/0126118 A1 | 5/2014 | Ewing et al. | |
| 2015/0103455 A1 | 4/2015 | Bailey | |
| 2015/0177797 A1 | 6/2015 | Butzer et al. | |

OTHER PUBLICATIONS

"Second Written Opinion Issued in PCT Application No. PCT/US2015/049869", Mailed Date: Aug. 18, 2016, 8 Pages.
"Benefit of Modular Design", Retrieved on: Mar. 20, 2014, Available at: http://www.tecnoimprese.it/user/0900_Doc/201206281022365_TQ%20COMPONENTS_Benefit%20of%20Modular%20Design%20-%20FTP/020Rev.105.pdf.

(Continued)

*Primary Examiner* — Carlos Amaya
(74) *Attorney, Agent, or Firm* — Liang IP, PLLC (57) ABSTRACT

Various techniques for flexible power supply in computing facilities are described herein. In one embodiment, a power distribution unit includes a first subsystem for receiving power from a power source and a second subsystem electrically coupled to one or more of the processing units in the component enclosure. The first subsystem includes a number of power supplies coupled to the power source, and the number of power supplies corresponds to a power requirement of the processing units.

20 Claims, 7 Drawing Sheets

(56) References Cited

OTHER PUBLICATIONS

Govindan, et al., "Modeling and Analysis of Availability of Datacenter Power Infrastructure", In Technical Report CSE, Mar. 20, 2014, 20 pages.

Barnes, et al., "The Feasibility of Replacing or Upgrading Utility Distribution Transformers During Routine Maintenance", Published on: Apr. 1995, Available at: http://web.ornl.gov/~webworks/cpr/v823/rpt/78562.pdf.

"QuickSpecs", Published on: Mar. 7, 2014, Available at: http://h18004.www1.hp.com/products/quickspecs/13650_div/13650_div.pdf.

"Liebert® Power Solutions", Published on: Mar. 20, 2014, Available at: http://www.emersonnetworkpower.com/documentation/en-us/products/surgeprotection/documents/sl-70100.pdf.

"International Search Report & Written Opinion Issued in PCT Application No. PCT/US2015/049869", Mailed Date Dec. 17, 2015, 11 Pages.

"International Preliminary Report on Patentability Issued in PCT Application No. PCT/US2015/049869", Mailed Date: Dec. 14, 2016, 9 Pages.

"Non-Final Office Action Issued in U.S. Appl. No. 14/308,645", dated Feb. 19, 2016, 19 Pages.

\* cited by examiner

FLEXIBLE POWER SUPPLIES FOR COMPUTING SYSTEMS

BACKGROUND

Modern computing facilities can have thousands of servers, input/output modules, routers, switches, and other types of processing units supported by a common utility infrastructure. The utility infrastructure can provide power to the processing units from a power grid, a battery bank, a diesel generator, or other power sources. The utility infrastructure can also include transformers, rectifiers, voltage regulators, circuit breakers, or other types of electrical/mechanical components that condition, monitor, and/or regulate the supplied power.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In certain computing facilities, a computing system may include multiple enclosures individually housing multiple component assemblies carrying servers, input/output modules, routers, switches, and/or other types of processing units. In each enclosure, a power distribution unit ("PDU") can distribute and supply power to the processing units from a main power source. The PDU typically can include one or more plugs, breakers, cords, receptacles, housings, and/or other electrical/mechanical components arranged in circuits that supply power from the main power source to the processing units.

To adequately provide power to processing units, the PDUs should have suitable power ratings corresponding to the processing units. Thus, different types and/or combinations of processing units in component assemblies may require PDUs with different power ratings. For example, component assemblies carrying processing units with high power ratings require different PDUs than those carrying processing units with low power ratings. Thus, facility operators may need to specify, design, or track a large number of component assemblies with different PDU power ratings, resulting in high design complexity, capital costs, and/or installation costs.

Several embodiments of the technology are directed to flexible power supplies for the PDUs to allow generally universal component assembly design. In certain embodiments, a PDU may be divided into a first subsystem independent of a component assembly and a second subsystem in the component assembly. The first subsystem can include multiple power supplies that draw from a common power source. Based on power ratings of the processing units in the component assembly, the number of power supplies in the first subsystem may be selected to adequately provide power to the processing units in the component assembly. The second subsystem can include receptacles, cords, or other components suitable to receive power from the first subsystem and to provide the receive power to the processing units. As a result, the second subsystem and the other components in the component assembly can be generally universal regardless of the power requirements of the processing units contained therein.

DETAILED DESCRIPTION

Certain embodiments of systems, devices, components, modules, routines, and processes for flexible power supplies in computing facilities are described below. In the following description, specific details of components are included to provide a thorough understanding of certain embodiments of the present technology. A person skilled in the relevant art will also understand that the technology may have additional embodiments. The technology may also be practiced without several of the details of the embodiments described below with reference to FIGS. 1-7B.

As used herein, the term "power distribution unit" or "PDU" generally refers to an apparatus with multiple power outlets configured to supply and/or distribute electrical power from a power source to multiple electrical or electronic devices. PDUs may be floor mounted, enclosure mounted, rack mounted, or may have other suitable structural profiles. Certain example PDUs may contain one or more power conversion and/or conditioning components that condition and/or transform one or more larger capacity power feeds into multiple lower-capacity power feeds. Example power conversion and/or conditioning components include transformers, circuit breakers, power filters, and power rectifiers. In other examples, PDUs may simply include a number of appliance or interconnection couplers.

Also used herein, the term "processing unit" generally refers to an electrical or electronic device configured to perform logic comparisons, arithmetic calculations, electronic communications, electronic input/output, and/or other suitable functions. Example processing units can include computing systems (e.g., servers, computers, etc.), computing devices (e.g., logic processors, network routers, network switches, network interface cards, data storage devices, etc.), or other suitable types of electronic apparatus. Multiple processing units may be organized into a component assembly and be carried by a housing, frame, rack, rail, or other suitable types of enclosure.

Also used herein, the term "connector" or "electrical connector" generally refers to an electro-mechanical device or assembly configured as an interface for coupling electrical circuits. A connector may include a housing that may have any of many mechanical forms. For example, a connector may include a plug or a socket that mates with the plug. In another example, a connector can be a coaxial connector, a Molex connector, or of other suitable types of connector. A connector may also include multiple conductors (e.g., wires) configured to carry power and/or signals. The conductors may be electrically parallel to and insulated from one another.

As discussed above, different types and/or combinations of processing units in component assemblies may require different PDUs, and result in high design complexity, capital costs, and/or installation costs. Several embodiments of the present technology can address at least some of the foregoing drawbacks by separating PDUs into a first subsystem independent of the component assemblies and a second subsystem in the component assemblies. The first subsystem may include a number of power supplies selected based on a power requirement of processing units in a particular component assembly. As such, component assemblies with different configurations of processing units may be designed, manufactured, and/or tracked regardless of the power requirements of the processing units.

Figure 1:
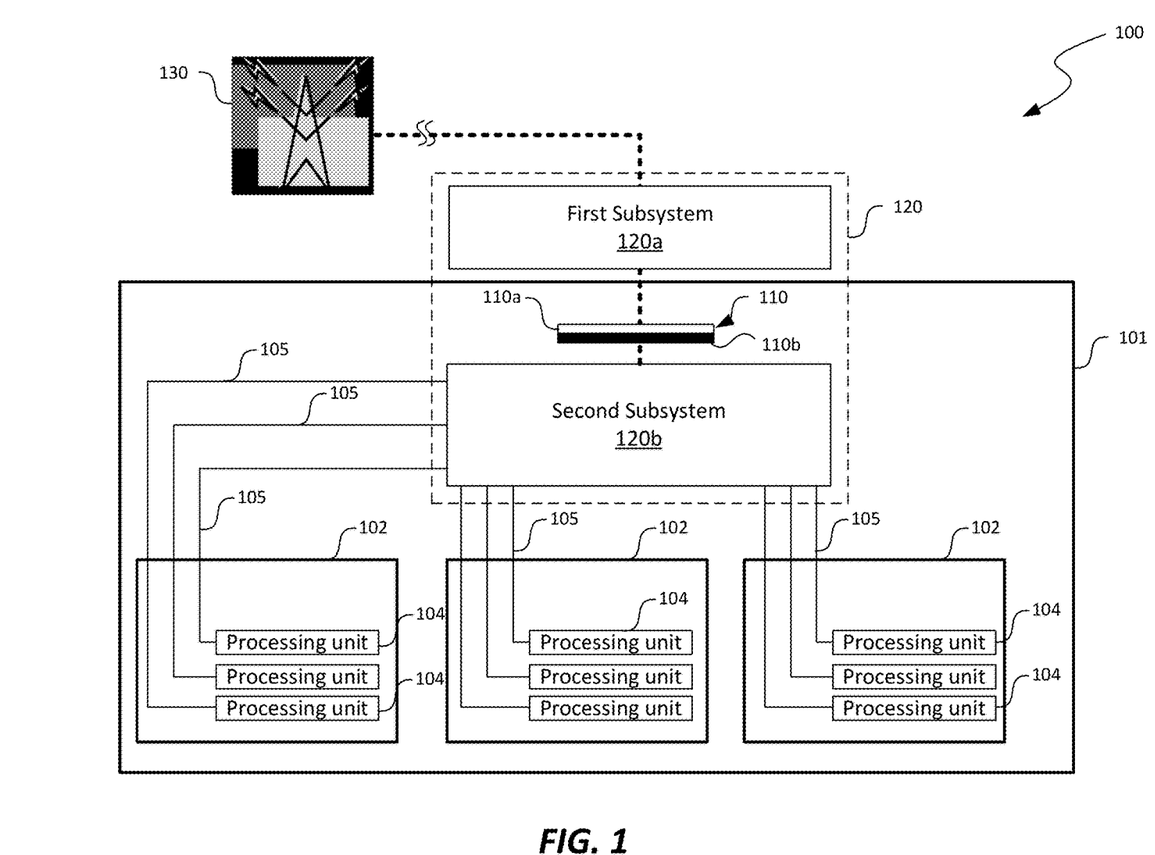
FIG. 1 is a schematic diagram illustrating a computing framework having flexible power supplies configured in accordance with embodiments of the present technology.

FIG. 1 is a schematic diagram illustrating a computing framework 100 having flexible power supplies configured in accordance with embodiments of the present technology. As shown in FIG. 1, the computing framework 100 can include a power source 130, a component enclosure 101 holding a plurality of processing units 104 organized in component assemblies 102, and a PDU 120 (shown in phantom lines for clarity) electrically coupling the power source 130 to the individual processing units 104. In the illustrated embodiment, the power source 130 includes a utility power grid. In other embodiments, the power source 130 can also include a battery bank, a diesel generator, and/or other suitable power sources with corresponding characteristics. Even though the particular components of the computing framework 100 are shown in FIG. 1, in other embodiments, the computing framework 100 can also include computer network components, supervisory stations, and/or other suitable components.

The component enclosure 101 can have a size and dimension configured to contain the processing units 104. For example, though not shown in FIG. 1, the component enclosure 101 can include a housing having an accessible panel, a ventilation fan, one or more temperature sensors, one or more intercoolers, and/or other suitable components. In other examples, the component enclosure 101 can also include a structural frame with or without a front, side, or back panel. In further examples, the component enclosure 101 can also include a shipping container and/or other suitable enclosing components. Even though only one component enclosure 101 and three component assemblies 102 are shown in FIG. 1, in other embodiments, the computing framework 100 can include any suitable numbers of enclosures 101 and/or component assemblies 102 in any suitable arrangements.

The processing units 104 can be configured to implement one or more computing applications, network communications, input/output capabilities, and/or other suitable functionalities, for example, as requested by an operator. In certain embodiments, the processing units 104 can include web servers, application servers, database servers, and/or other suitable computing components. In other embodiments, the processing units can include routers, network switches, analog/digital input/output modules, modems, and/or other suitable electronic components. FIG. 1 shows three processing units 104 in each of the component assemblies 102 for illustration purposes. In other embodiments, any other suitable numbers of processing units 104 with generally similar or different configurations may reside in each of the component assemblies 102, in the component enclosure 101, or in additional enclosures (not shown).

As shown in FIG. 1, the PDU 120 can include a first subsystem 120a, a second subsystem 120b, and a set of connectors 110 electrically coupling the first and second subsystems 120a and 120b. The first subsystem 120a can be configured to receive power from the power source 130. The set of connectors 110 then allow the received power to flow from the first subsystem 120a to the second subsystem 120b. The second subsystem 120b can be electrically coupled to the individual processing units 104 via a plurality of wires 105 to provide the received power to the individual processing units 104. In the illustrated embodiment, the first subsystem 120a is shown external to the component enclosure 101 while the set of connectors 110 and the second subsystem 120b are shown internal to the component enclosure 101. In other embodiments, the set of connectors 110 may be external to the component enclosure 101. In further embodiments, all components of the PDU 120 may be internal to the component enclosure 101 or may have other suitable arrangements.

In FIG. 1, the first subsystem 120a can include a select number of power supplies (not shown) based on power requirements of the processing units 104 in the component enclosure 101. As such, a total power rating of the power supplies is greater than or equal to the power requirements of the processing units 104. For example, in one embodiment, a first total power requirement of the processing units 104 (e.g., 18 KW) may require two power supplies. A second total power requirement (e.g., 27 KW) may require three power supplies. A third total power requirement (e.g., 54 KW) may require six power supplies. In other embodiments, the first subsystem 120a can include four, five, or any other suitable number of power supplies. In certain embodiments, the power supplies can draw power from a common power source, for example, the power source 130. In other embodiments, the power supplies can draw power from different power sources (not shown). Certain examples of the first subsystem 120a are described in more detail below with reference to FIGS. 2-4.

The second subsystem 120b can be configured independently based on characteristics of the processing units 104 in the component assemblies 102. For example, the second subsystem 120b can include receptacles, cords, or other components arranged in circuits that correspond to configurations of the processing units 104 in the component assemblies 102. The receptacles, cords, or other components, however, can be selected, designed, and/or otherwise provided irrespective of the first subsystem 120a. Thus, the second subsystem 120b may be common or "universal" irrespective of the characteristics of the first subsystem 120a. As a result, manufacturing complexities of the component assemblies 102 may be reduced when compared to conventional techniques. One example second subsystem 120b is described in more detail below with reference to FIG. 5.

The set of connectors 110 can be configured to electrically connect the first subsystem 120a to the second subsystem 120b. The set of connectors 110 can mate with each other in any suitable fashion. For example, the set of connectors 110 can include a plug and a socket configured to mate with the plug. In the illustrated embodiment, the set of connectors 110 are shown as a first connector 110a associated with the first subsystem 120a and a second connector 110b associated with the second subsystem 120b of the PDU 120 located inside the component enclosure 101. In other embodiments, the set of connectors 110 may include multiple subsets of connectors or may have other suitable arrangements located outside the component enclosure 101 or at other suitable locations. Example connectors 110 are described in more detail below with reference to FIGS. 6A-7B.

In operation, the first subsystem 120a of the PDU 120 receives power from the power source 130. In certain embodiments, the multiple power supplies in the first subsystem 120a can draw power from the power source 130. In other embodiments, the power supplies can draw power from the power source 130 in other suitable manners. The individual power supplies of the first subsystem 120a can then distribute the received power into one or more branches. The set of connectors 110 then allows the distributed power to flow along the branches from the first subsystem 120a, via the second subsystem 120b, and to the processing units 104 in the individual component assemblies 102 of the component enclosure 101.

Certain embodiments of the computing framework 100 can reduce capital costs for hardware upgrades. Unlike conventional systems in which PDUs for component enclosures 101 are fully replaced due to different power requirements of upgraded processing units 104, the first subsystem 120a of the PDU 120 may be retained, reconfigured, modified, and reutilized during upgrades. For example, the first subsystem 120a may be modified to include more (or less) number of power supplies from an original configuration depending on the new power requirements. As a result, capital costs during hardware upgrades may be reduced when compared to conventional techniques.

Figure 2:
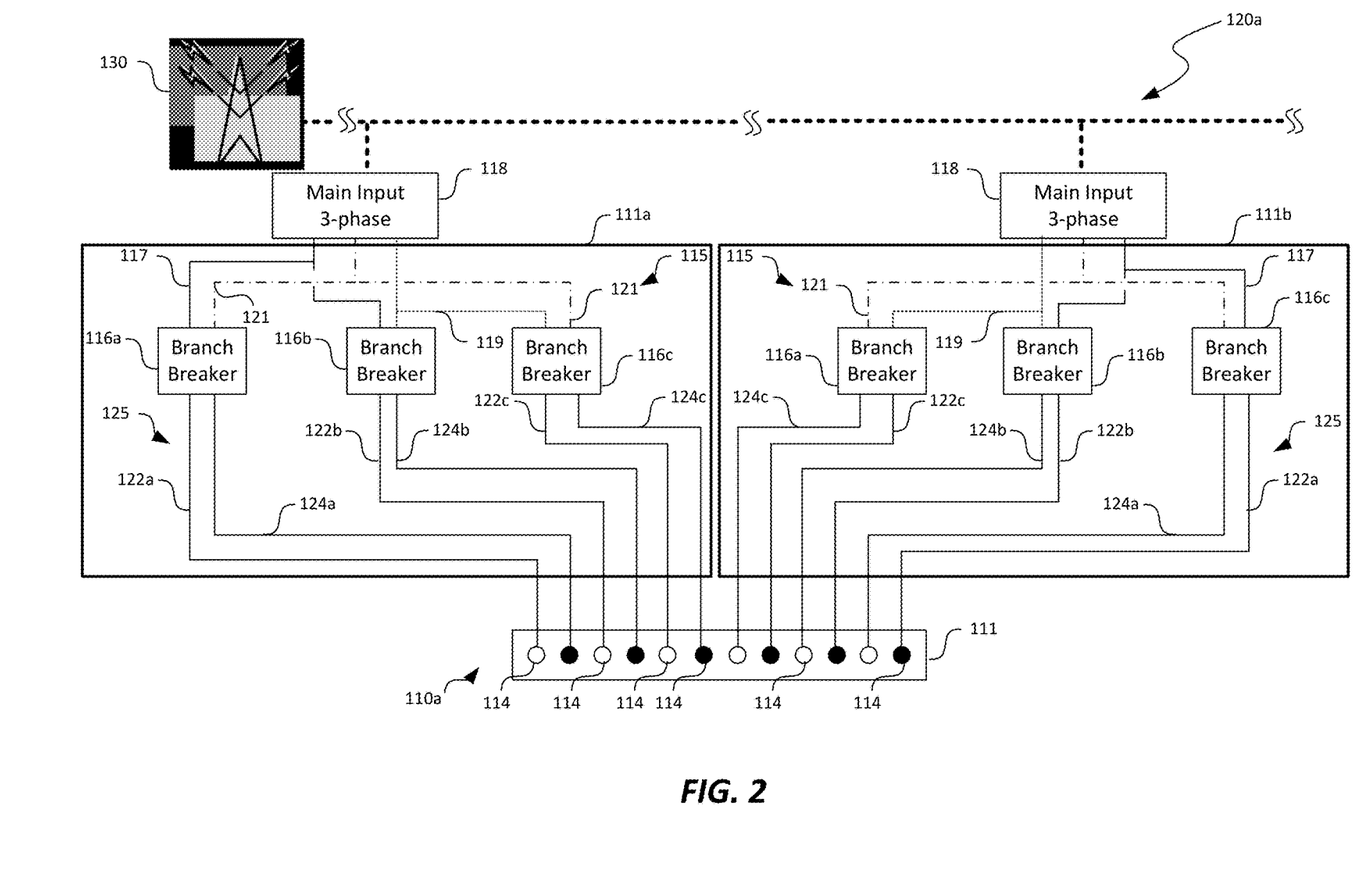
FIG. 2 is a schematic diagram illustrating a first subsystem having two power supplies suitable for the power distribution unit of FIG. 1 in accordance with embodiments of the present technology.

FIG. 2 is a schematic diagram illustrating a first subsystem 110a having two power supplies suitable for the power distribution unit 120 of FIG. 1 in accordance with embodiments of the present technology. As shown in FIG. 2, the first subsystem 120a can include a first power supply 111a and a second power supply 111b arranged to draw power from the common power source 130. Even though the first and second power supplies 111a and 111b are shown in FIG. 2 as having similar components, in other embodiments, the first and second power supplies 111a and 111b can also have different components. In further embodiments, the first and/or second power supplies 111a and 111b can include power filtering, conditioning, switching, and/or other suitable types of components in addition to or in lieu of those shown in FIG. 2.

In the illustrated embodiment of FIG. 2, each of the first and second power supplies 111a and 111b can each include a plurality of branch breakers 116 (shown individually as first to third branch breakers 116a-116c, respectively) and a plurality of wires 115 electrically connecting the branch breakers 116 to a main input 118 from the power source 130 to form a plurality of branch circuits. For example, the first branch breaker 116a is electrically connected to voltage lines 117 and 121 of the main input 118. The second branch breaker 116b is electrically connected to voltage lines 117 and 119 of the main input 118. The third branch breaker 116c is electrically connected to voltage lines 119 and 121 of the main input 118.

In FIG. 2, the main input 118 is shown as a three-phase delta input for illustration purposes. In other embodiments, the main input 118 can also include a single phase input, a three phase wye, or other suitable types of input. In these embodiments, the first, second, and third branch breakers 116a-116c may have other suitable connectivity to the main input 118. In the illustrated embodiment, three branch breakers 116a-116c are shown for illustration purposes. In other embodiments, the first subsystem 120a can include three, four, or any other suitable number of branch breakers 116 and associated branch circuits. In further embodiments, one or more of the branch breakers 116a-116c may be omitted.

As shown in FIG. 2, the first connector 110a can include a housing 111 holding multiple conductors 114. The multiple conductors 114 are electrically insulated from one another. In certain embodiments, a plurality of wires 125 can directly connect the individual branch breakers 116 to one of the conductors 114 in the first connector 110a. For example, the first branch breaker 116a is connected to a pair of the conductors 114 via wires 122a and 124a. The second branch breaker 116b is connected to another pair of the conductors 114 via wires 122b and 124b. The third branch breaker 116c is connected to yet another pair of the conductors 114 via wires 122c and 124c. In other embodiments, a ground wire (not shown) can also connect the main input 118 to one of the conductors 114 (not shown). As mentioned above, the first connector 110a is configured to mate with the second connector 110b as described in more detail below with reference to FIGS. 6A-7B.

Figure 3:
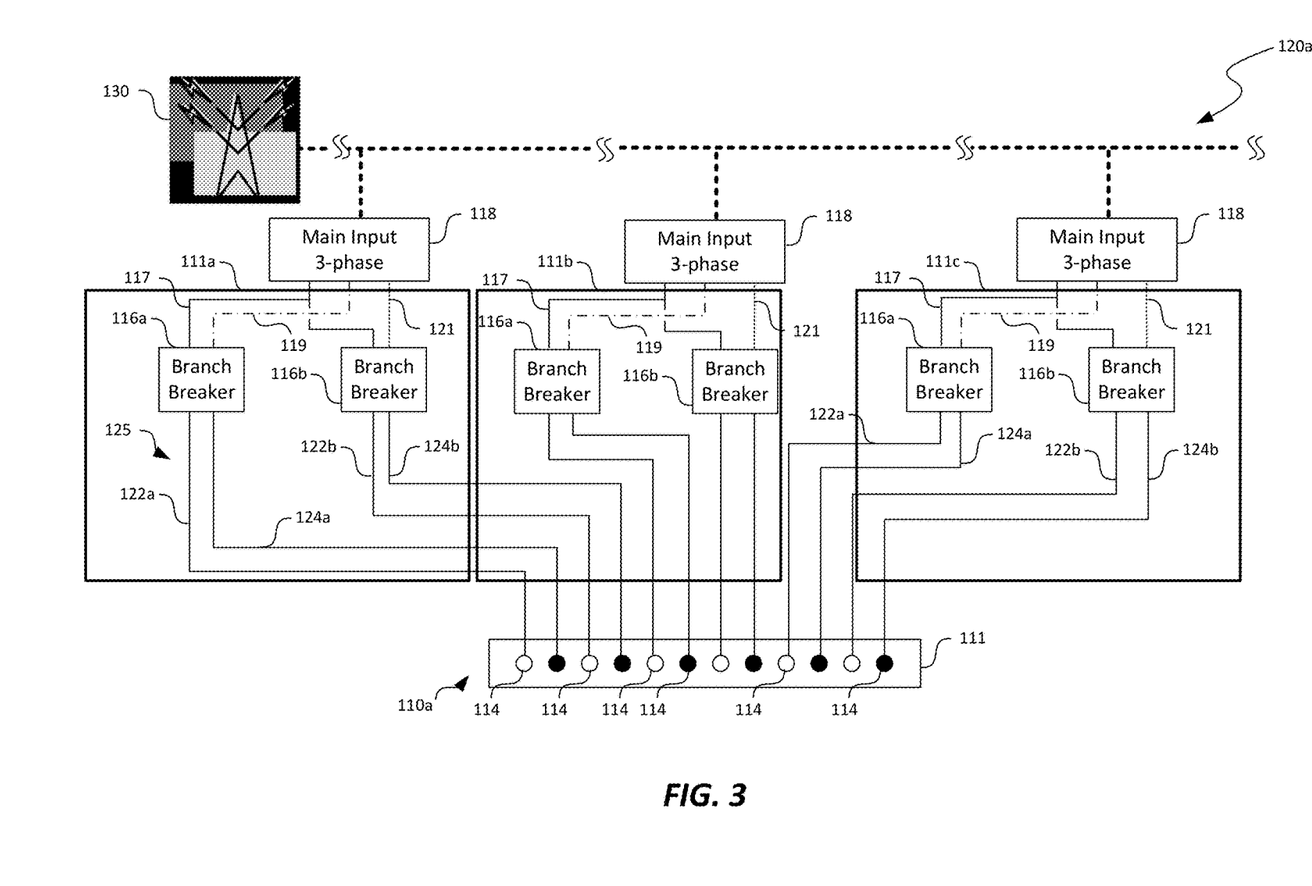
FIG. 3 is a schematic diagram illustrating a first subsystem having three power supplies suitable for the power distribution unit of FIG. 1 in accordance with embodiments of the present technology.

FIG. 3 is a schematic diagram illustrating a first subsystem 120a having three power supplies suitable for the power distribution unit 120 of FIG. 1 in accordance with embodiments of the present technology. As shown in FIG. 3, instead of having three branch breakers 116 each, the power supplies 111a-111c each include two branch breakers 116 electrically coupled to respective main input 118. Similar to the branch breakers 116 in FIG. 2, each of the branch breakers 116 are electrically connected to individual conductors 114 of the first connector 110a via the wires 125.

Figure 4:
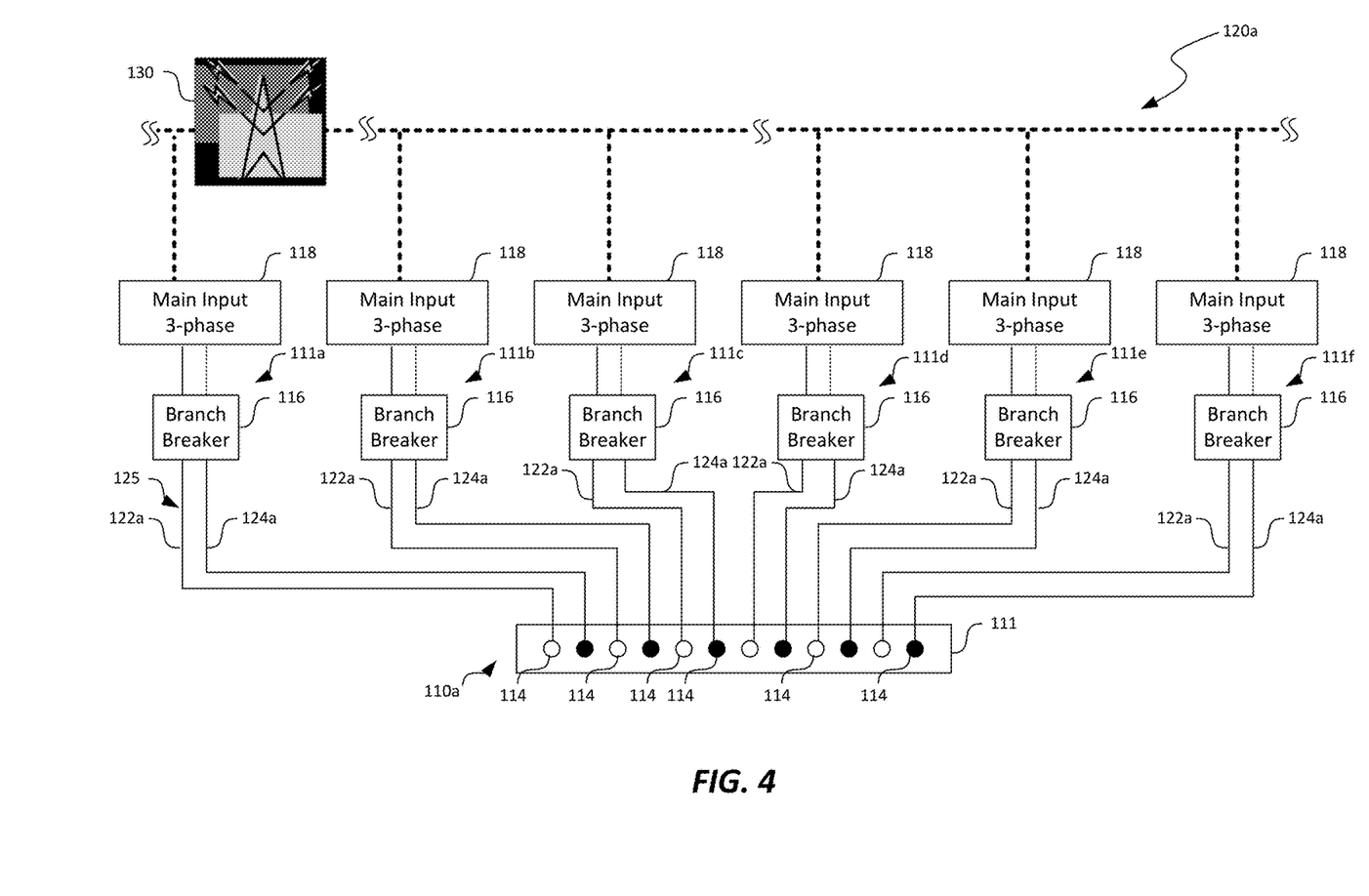
FIG. 4 is a schematic diagram illustrating a first subsystem having four power supplies suitable for the power distribution unit of FIG. 1 in accordance with embodiments of the present technology.

FIG. 4 is a schematic diagram illustrating a first subsystem 120a having six power supplies and suitable for the power distribution unit of FIG. 1 in accordance with embodiments of the present technology. As shown in FIG. 4, instead of having two or three branch breakers 116 each, the power supplies 111a-111f each include one branch breaker 116 electrically coupled to respective main input 118. Similar to the branch breakers 116 in FIGS. 2 and 3, each of the branch breakers 116 are electrically connected to individual conductors 114 of the first connector 110a via the wires 125.

Figure 5:
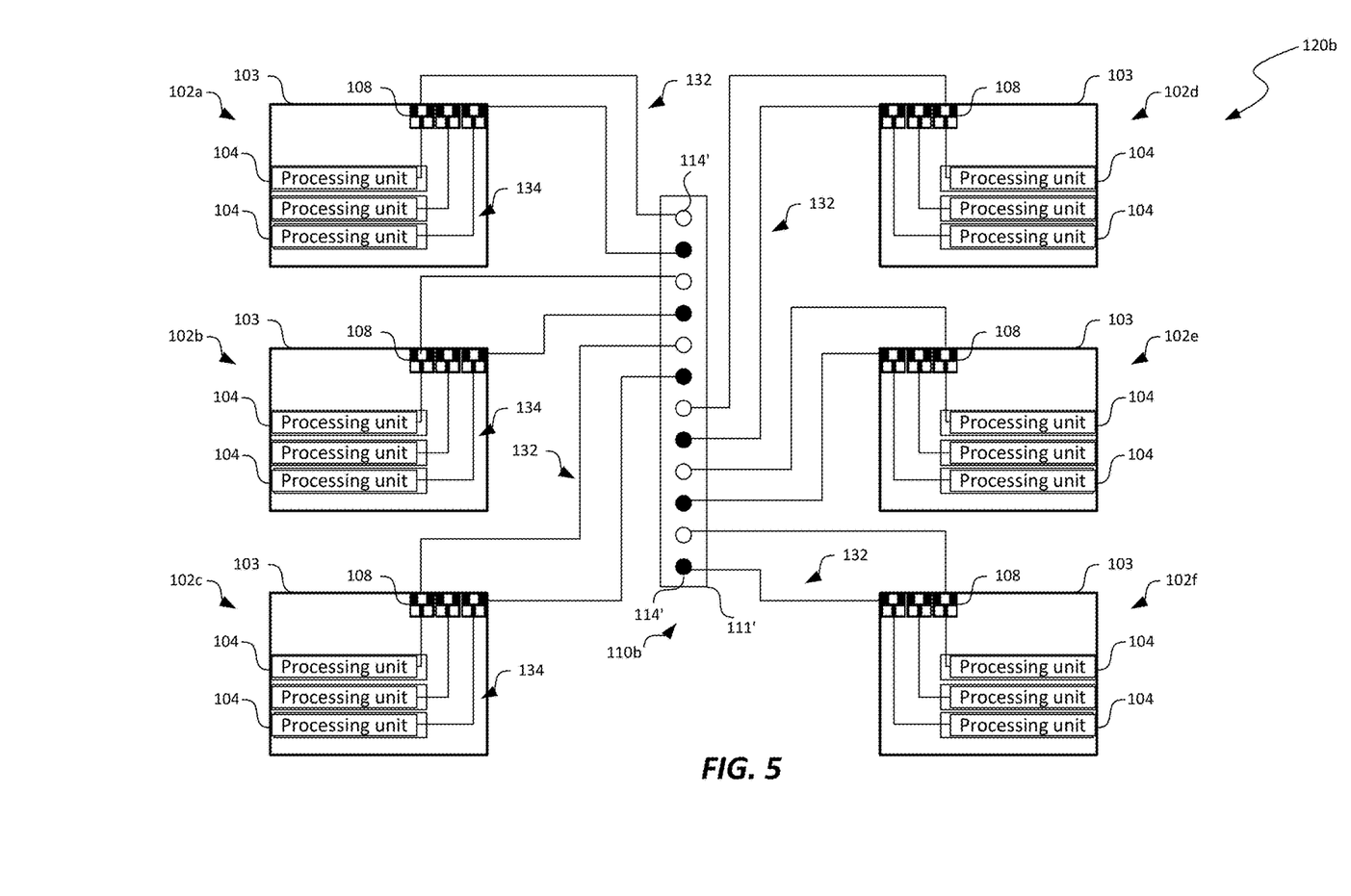
FIG. 5 is a schematic diagram illustrating a second subsystem suitable for the power distribution unit of FIG. 1 in accordance with embodiments of the present technology.

FIG. 5 is a schematic diagram illustrating a second subsystem 120b suitable for the power distribution unit of FIG. 1 in accordance with embodiments of the present technology. In FIG. 5, six component assemblies 102 with corresponding processing units 104 are shown electrically coupled to the second connector 110b for illustration purposes. In other embodiments, the second subsystem 120b can also include additional or fewer component assemblies 102 and/or corresponding processing units 104.

As shown in FIG. 5, the second connector 110b can have a configuration suitable to mate with the first connector 110a. For example, the second connector 110b can include a housing 111' holding multiple conductors 114'. Each of the conductors 114' may be configured to mate with a corresponding conductor 114 (FIGS. 2-4) of the first connector 110a, respectively. In other embodiments, the second connector 110b may have a configuration different than that of the first connector 110a by, for example, having additional or different conductors, conductor arrangements, housing designs, and/or other characteristics. Several examples are described below with reference to FIGS. 7A and 7B.

As shown in FIG. 5, the second subsystem 120b can include a plurality of receptacles 108 individually connected to one of the processing units 104 via corresponding wires 134. The processing units 104 are individually received in a frame 103 of the component assembly 102. The set of wires 132 directly connect the receptacles 108 in the component assembly 102 to one or more conductors 114' of the second connector 110b. In the illustrated embodiment, the receptacles 108 are each connected to a pair of the conductors 114' in a single branch circuit. In other embodiments, at least one of the receptacles 108 may be connected in an additional branch circuit (not shown).

Even though the receptacles 108 are shown in FIG. 5 as being carried by, installed in, or incorporated into the frame 103 of the component assembly 102, in other embodiments, the receptacles 108 may be separate from the frame 103 of the component assembly 102 or having other suitable arrangements. In further embodiments, the receptacles 108 may be omitted, and the processing units 104 may be directed connected to the individual conductors 114' of the second connector 110b via suitable wires (not shown). In yet further embodiments, the second subsystem 120b may also include surge protectors, voltage monitors, and/or other suitable types of electrical/mechanical components. In yet other embodiments, the first and/or second subsystems 120a and 120b of the PDU 120 may also include one or more monitoring components (e.g., voltage monitors, current monitors, etc.), control components (e.g., remote power cycling controllers), and/or other suitable electrical components.

Figure 6A:
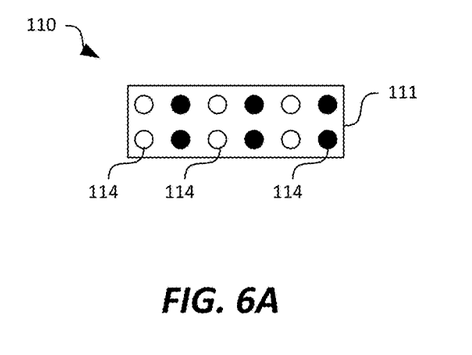
FIGS. 6A-6C are schematic diagrams illustrating various example configurations of a connector suitable for the power distribution unit of FIG. 1 in accordance with embodiments of the present technology.
Figure 6B:
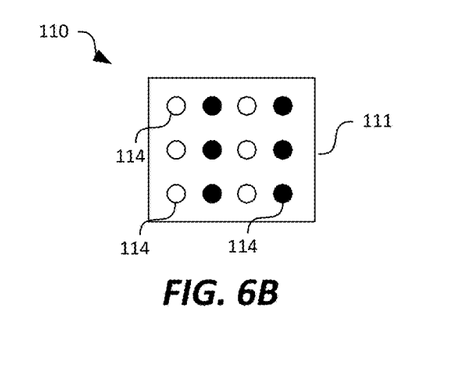
Figure 6C:
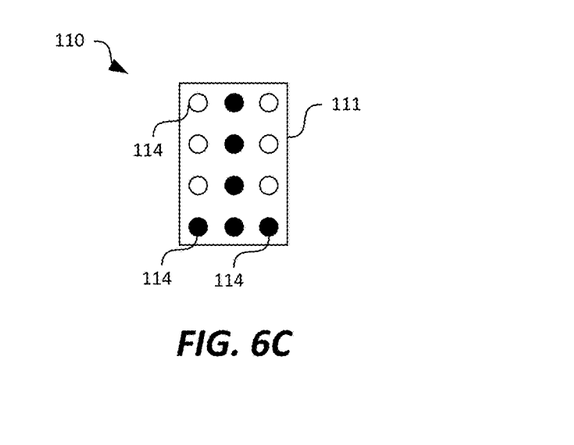

Even though the conductors 114 in the first and second connectors 110a and 110b are shown as a 1×12 linear array in FIG. 2-5, in other embodiments, the first and/or second connector 110a and 110b can have other suitable configurations. FIGS. 6A-6C are schematic diagrams illustrating various example configurations of a connector 110 suitable for the power distribution unit of FIG. 1 in accordance with embodiments of the present technology. For example, the connector 110 can be the first connector 110a and/or the second connector 110b in FIG. 1. As shown in FIGS. 6A-6C, the connector 110 can include a housing 111 carrying a plurality of conductors 114 arranged in a 2×6 array, a 3×4 array, and a 4×3 array, respectively. In other embodiments, the conductors 114 can also have other suitable arrangements.

Figure 7A:
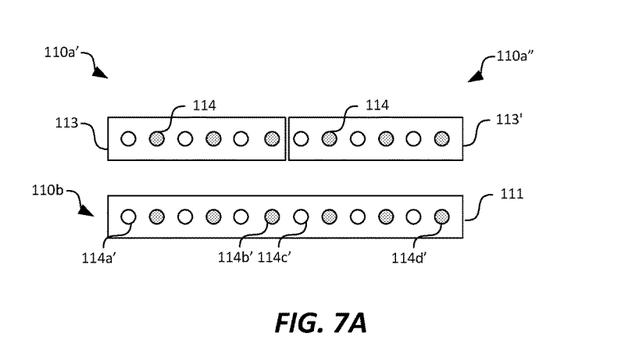
FIGS. 7A and 7B are schematic diagrams illustrating various example configurations of additional connectors suitable for the power distribution unit of FIG. 1 in accordance with embodiments of the present technology.
Figure 7B:
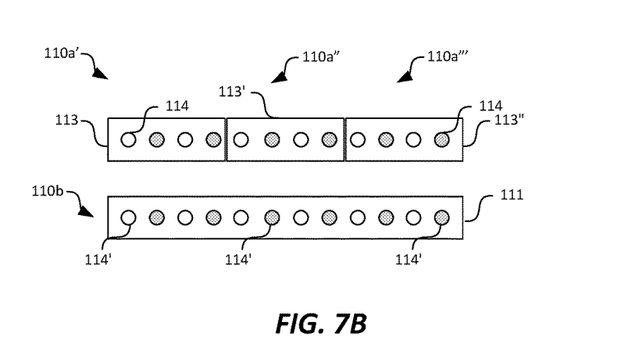

In certain embodiments, the first and second connectors 110a and 110b may have different configurations. For example, FIGS. 7A and 7B are schematic diagrams illustrating various example configurations of additional connectors 110 suitable for the power distribution unit of FIG. 1 in accordance with embodiments of the present technology. As shown in FIG. 7A, the first connector 110a can include a first connector portion 110a' separate from a second connector portion 110a". Each of the first connector portions 110a' and 110a" include a housing 113 and 113' individually carrying six conductors 114. Each of the first connector portions 110a' and 110a" is configured to mate with a portion of the conductors 114' in the second connector 110b. For example, the first connector portion 110a' is configured to mate with conductors 114a' to 114b'. The second connector portion 110b' is configured to mate with conductors 114c' to 114d'. In certain embodiments, the first and second connector portions 110a and 110a' can correspond to the power supplies 111a and 111b in FIG. 2, respectively. In other embodiments, the first and second connector portions 110a and 110a' can have other suitable configurations with respect to the power supplies 111a and 111b.

In another embodiment as shown in FIG. 7B, instead of two first connector portions, the first connector 110a include three first connector portions 110a', 110a", and 110a'" each having a housing 113, 113', and 113", respectively and four conductors 114. Similar to the first connector 110a shown in FIG. 7A, each of the first connector portions 110a'-110a'" is configured to mate with a portion of the conductors 114' in the second connector 110b. In certain embodiments, the first, second, and third connector portions 110a, 110a', and 110a" can correspond to the power supplies 111a-111c in FIG. 3. In other embodiments, the first, second, and third connector portions 110a-110a" can have other suitable configurations with respect to the power supplies 111a-111c.

Specific embodiments of the technology have been described above for purposes of illustration. However, various modifications may be made without deviating from the foregoing disclosure. In addition, many of the elements of one embodiment may be combined with other embodiments in addition to or in lieu of the elements of the other embodiments. Accordingly, the technology is not limited except as by the appended claims.

I claim:

1. A power distribution unit ("PDU") for a component enclosure having a plurality of processing units, the PDU comprising:
    a first subsystem for receiving power from a power source;
    a second subsystem electrically coupled to one or more of the processing units in the component enclosure, wherein the first subsystem includes a number of power supplies coupled to the power source to draw power from the power source, the number of power supplies corresponding to a power requirement of the processing units in the component enclosure; and
    a set of connectors electrically coupling the first subsystem to the second subsystem allowing the power from the power source to flow from the first subsystem, via the second subsystem, and to the processing units in the component enclosure, wherein the set of connectors include:
        a number of first connectors each corresponding to one of the number of power supplies; and
        a second connector electrically coupled to the one or more processing units in the component enclosure, wherein each of the first connectors is mated with a portion of the second connector.

2. The power distribution unit of claim 1 wherein the first subsystem includes two, three, or six power supplies coupled to the power source.

3. The power distribution unit of claim 1 wherein:
    each of the power supplies of the first subsystem includes a plurality of branch breakers coupled to a main input from the power source, the branch breakers each being electrically coupled to one of the first connectors.

4. The power distribution unit of claim 1 wherein:
    each of the power supplies of the first subsystem includes a plurality of branch breakers coupled to a main input from the power source, the branch breakers each being electrically coupled to one of the conductors of one of the first connectors.

5. The power distribution unit of claim 1 wherein:
    each of the power supplies of the first subsystem includes:
        one or more branch breakers coupled to a main input from the power source; and
        a plurality of conductive wires individually coupling one of the branch breakers to a pair of the conductors in one of the first connectors.

6. The power distribution unit of claim 1 wherein:
each of the power supplies of the first subsystem includes:
  a single branch breaker coupled to a main input from the power source; and
  a plurality of conductive wires individually coupling the branch breaker to a pair of the conductors in one of the first connectors.

7. The power distribution unit of claim 1 wherein:
each of the power supplies of the first subsystem includes one or more branch breakers coupled to a main input from the power source, the branch breakers being individually coupled to a pair of first conductors of one of the first connectors; and
the second subsystem includes a plurality of second conductors and receptacles each electrically coupled to a pair of the second conductors in the second connector.

8. The power distribution unit of claim 1 wherein:
each of the power supplies of the first subsystem includes one or more branch breakers coupled to a main input from the power source, the branch breakers being individually coupled to a pair of first conductors of one of the first connectors; and
the second subsystem includes a plurality of second conductors and receptacles each electrically coupled to a pair of the second conductors in the second connector, at least one of the plurality of receptacles being attached to the component enclosure and corresponding to one or more of the processing units in the component enclosure.

9. The power distribution unit of claim 1 wherein the first subsystem is external to the component enclosure, and wherein the second subsystem and the set of connectors are internal to the component enclosure.

10. The power distribution unit of claim 1 wherein the first subsystem, the second subsystem, and the set of connectors are located internal to the component enclosure.

11. The power distribution unit of claim 1 wherein the first connectors and the second connector each includes a plurality of conductors, the conductors of the first connectors have a different configuration then the conductors of the second connector.

12. A power distribution unit ("PDU") for a component enclosure having a plurality of processing units, the PDU comprising:
  a plurality of power supplies electrically coupled to a power source to draw power from the power source, the plurality of power supplies each including one or more branch breakers;
  a plurality of first connectors each having a plurality of conductors electrically insulated from one another; and
  a plurality of conductive wires individually connecting one of the branch breakers to a pair of the conductors in one of the first connectors, wherein a number of the first connectors corresponds to a number of the power supplies and the number of the power supplies corresponds to a power requirement of the processing units in the component enclosure; and
  a second connector electrically coupled to the one or more processing units in the component enclosure, wherein each of the first connectors is mated with a portion of the second connector to allow power to flow from the power source to the processing units in the component enclosure via the first connectors and the second connector.

13. The power distribution unit of claim 12 wherein a total power rating of the power supplies is greater than or equal to the power requirement of the processing units.

14. The power distribution unit of claim 12 wherein the plurality of conductive wires directly connect one of the branch breakers to a pair of the conductors in one of the first connectors.

15. The power distribution unit of claim 12 wherein the power supplies have generally similar electrical configurations.

16. A computing system, comprising:
  a component assembly having a frame and a plurality of processing units carried by the frame; and
  a power distribution unit including:
    a first subsystem for receiving power from a power source;
    a second subsystem electrically coupled to one or more of the processing units in the component assembly, wherein the first subsystem includes a plurality of power supplies coupled to the power source to draw power from the power source; and
    a set of connectors electrically coupling the first subsystem to the second subsystem allowing the power from the power source to flow from the first subsystem, via the second subsystem, and to the processing units, wherein the set of connectors include:
      a number of first connectors each corresponding to one of the number of power supplies; and
      a second connector electrically coupled to the one or more processing units in the component enclosure, wherein each of the first connectors is mated with a portion of the second connector.

17. The computing system of claim 16 wherein a number of the power supplies in the first subsystem corresponds to a power requirement of the processing units.

18. The computing system of claim 16 wherein a number of the power supplies in the first subsystem corresponds to a power requirement of the processing units, and wherein a total power rating of the power supplies in the first subsystem is greater than or equal to the power requirement of the processing units.

19. The computing system of claim 16 wherein a number of the power supplies in the first subsystem is modifiable based on a power requirement of the processing units.

20. The computing system of claim 16 wherein the first subsystem includes six power supplies individually having a single branch breaker, and wherein the computing system further includes a set of wires electrically coupling the branch breakers to a pair of conductors in one of the first connectors.

* * * * *